Oct. 15, 1940.　　　　W. H. JOHNSON　　　　2,218,314
REVERSING MECHANISM
Filed Feb. 19, 1938　　　5 Sheets-Sheet 1

INVENTOR
William H. Johnson
BY
Albert M. Austin
ATTORNEY

Oct. 15, 1940.                W. H. JOHNSON                 2,218,314
                           REVERSING MECHANISM
                    Filed Feb. 19, 1938      5 Sheets—Sheet 2
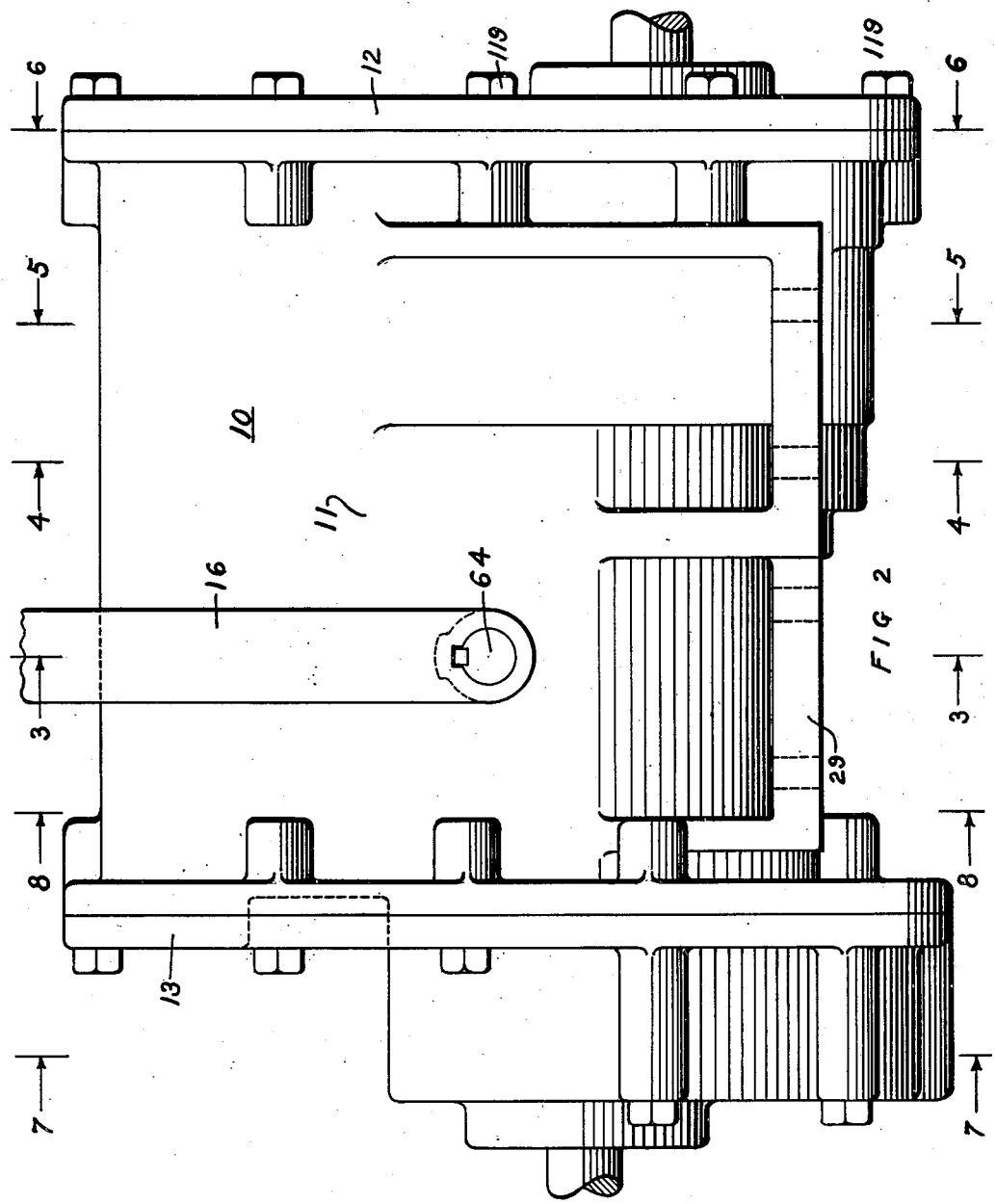
INVENTOR
William H. Johnson
BY
Albert H. Austin
ATTORNEY Oct. 15, 1940.　　　W. H. JOHNSON　　　2,218,314
REVERSING MECHANISM
Filed Feb. 19, 1938　　　5 Sheets-Sheet 3

INVENTOR
William H. Johnson
BY
Albert M. Austin
ATTORNEY

Oct. 15, 1940.  W. H. JOHNSON  2,218,314
REVERSING MECHANISM
Filed Feb. 19, 1938   5 Sheets-Sheet 4

INVENTOR
William H. Johnson
BY
Albert M. Austin
ATTORNEY

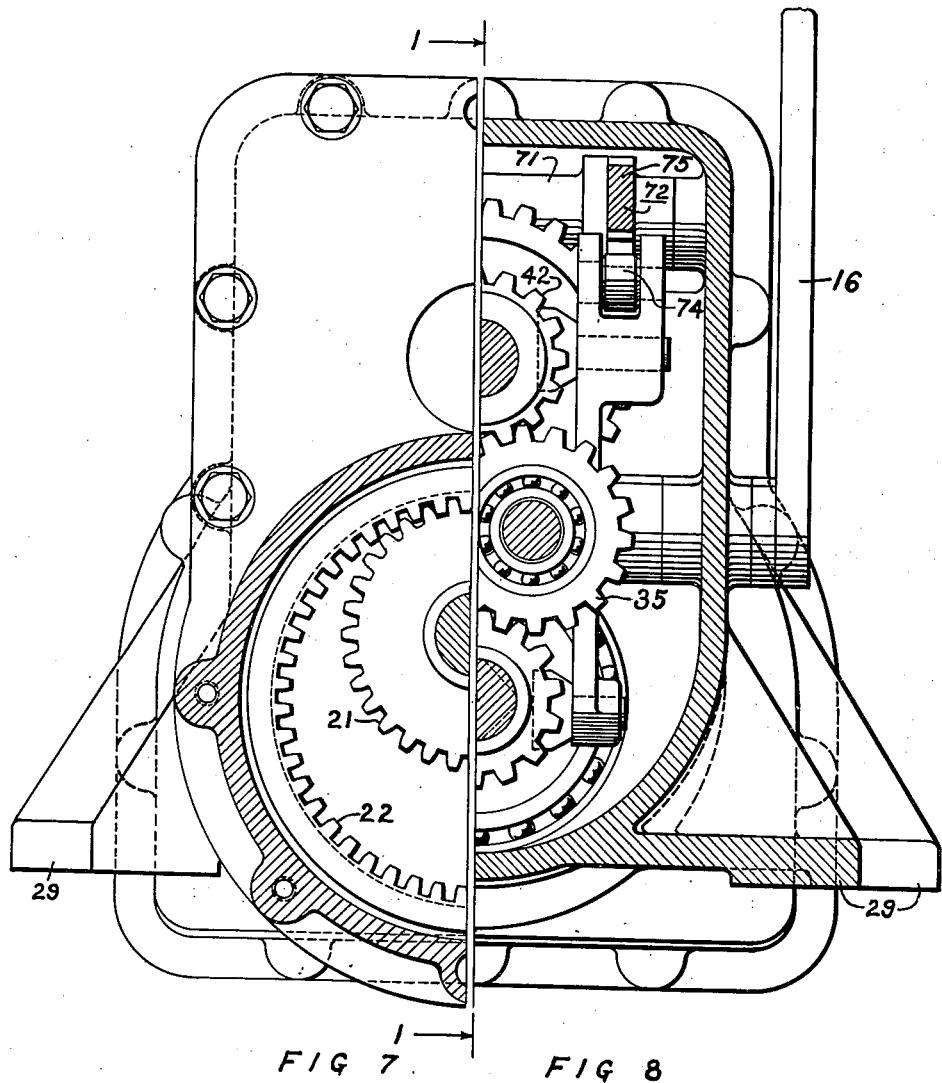

Patented Oct. 15, 1940

2,218,314

UNITED STATES PATENT OFFICE 2,218,314

REVERSING MECHANISM

William Horace Johnson, Cranston, R. I., assignor to Weskenson Corporation, Providence, R. I., a corporation of Rhode Island Application February 19, 1938, Serial No. 191,432

10 Claims. (Cl. 192—4)

The invention relates to a mechanical transmission and, more particularly, to a reversing mechanism.

The invention relates to a mechanical transmission of the type having one forward speed and one reverse speed, such as used, for example, in motor boats and launches, although, of course, the invention is not limited to such use. The invention provides for the immediate shifting from forward to reverse, or from reverse to forward, without requiring a clutch or other device for removing the load torque from the gears.

The invention contemplates a special braking and rebound device for stopping the driven or load shaft and changing its direction during the shifting operation to facilitate shifting.

The invention also consists in certain new and original features of construction and combination of parts hereinafter set forth and claimed.

Figure 1:
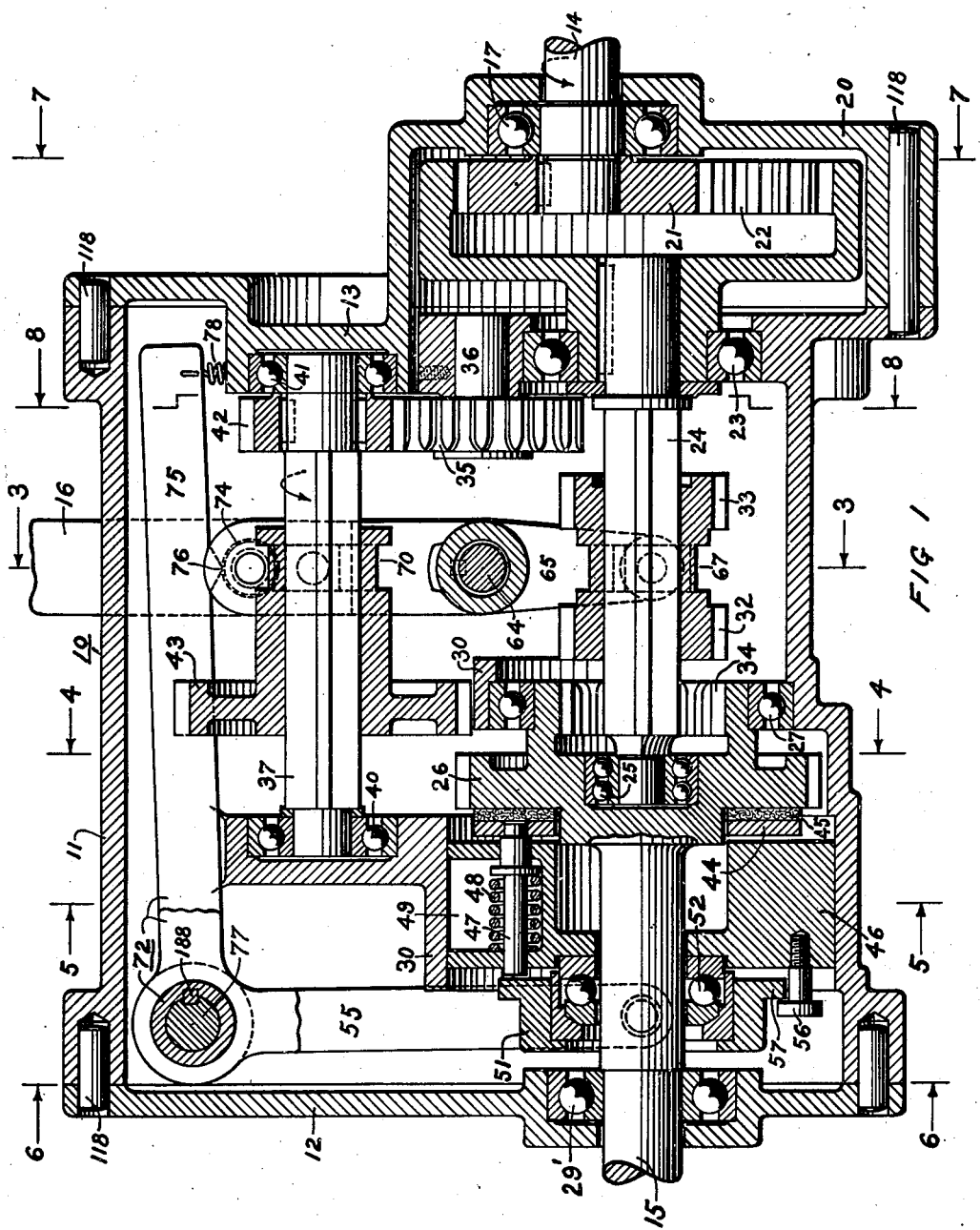
Figures 3, 4:
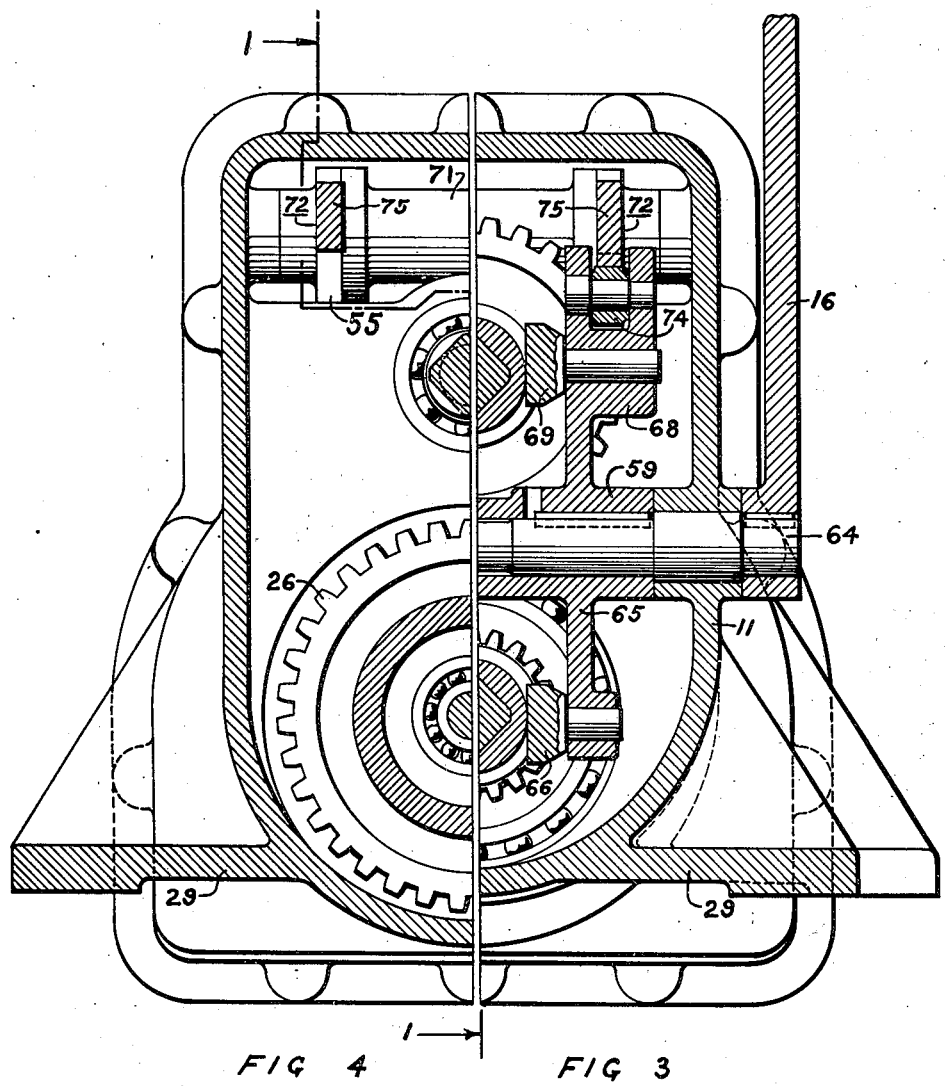

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical longitudinal section through the transmission taken on the line 1—1 of Figs. 3-8;

Fig. 2 is a vertical side elevation of the transmission;

Figs. 3–8 are transmission sections taken on the lines 3—3, 4—4, 5—5, 6—6, 7—7 and 8—8 of Figs. 1 and 2.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and, more particularly, to Figs. 1 and 2, the transmission is enclosed within a casing 10 made up of a cylindrical body 11 and heads 12 and 13. The heads are secured to the body by the pins and bolts, indicated in general by 118 and 119. The pins 118 serve to line up the heads 12 and 13 with respect to the body 11 and the bolts 119 serve to clamp these members securely together. The pin connection 118 and bolt connection 119 are well known and, in themselves, form no part of the present invention.

The sides of the body 11 may be provided with supporting flanges 29 through which suitable holddown bolts (not shown) may pass for the purpose of supporting the reverse mechanism to the frame of the motor boat or launch, or other devices with which the reverse mechanism is used.

Referring now more particularly to Figs. 1 and 2, the drive shaft is indicated by 14 and extends to a suitable prime mover, such as an internal combustion engine, or a Diesel engine, driving the vehicle, which may be a motor boat, launch or yacht, for example. The driven shaft is indicated by 15 and this shaft extends to the load, which, in the case of a motor boat, launch or yacht, will be the propeller. The shift lever is indicated by 16. This lever will extend to a position convenient to the operator and is used for shifting from forward to reverse, or vice versa, by a simple forward or backward movement of the lever.

The drive shaft 14 is journalled in a ball bearing assembly 17 located in the hub of extension 20 on the head 13. Shaft 14 is connected to a spur gear 21 which meshes an internal gear 22 journalled in ball bearing assembly 23 located in a bearing seat in body 11. Square shaft 24 is keyed to internal gear 22 and is journalled in ball bearing assembly 25 located within special gear 26.

Special gear 26 is journalled in a ball bearing assembly 27 seated in flange 30 (Figs. 5 and 6) of body 11. Special gear 26 has attached thereto the driven shaft 15 journalled in ball bearing assembly 29' seated in a hub of head 12.

Slidable on square shaft 24 is a compound slide gear made up of gears 32 and 33. Gear 32 is meshable with internal gear 34 secured to a part of special gear 26. Gears 32 and 34 form, in effect, a toothed clutch. Gear 33 is meshable with transfer gear 35 journalled on stud 36 fast in body 11.

The square countershaft 37 is journalled in ball bearing assemblies 40 and 41. Assembly 40 rests on a seat attached to body 11 and assembly 41 rests in a seat attached to head 13. Keyed to square shaft 37 is a spur gear 42 permanently meshing with transfer gear 35. Slidably mounted on shaft 37 is sliding gear 43 meshable with special gear 26.

Figures 5, 6:
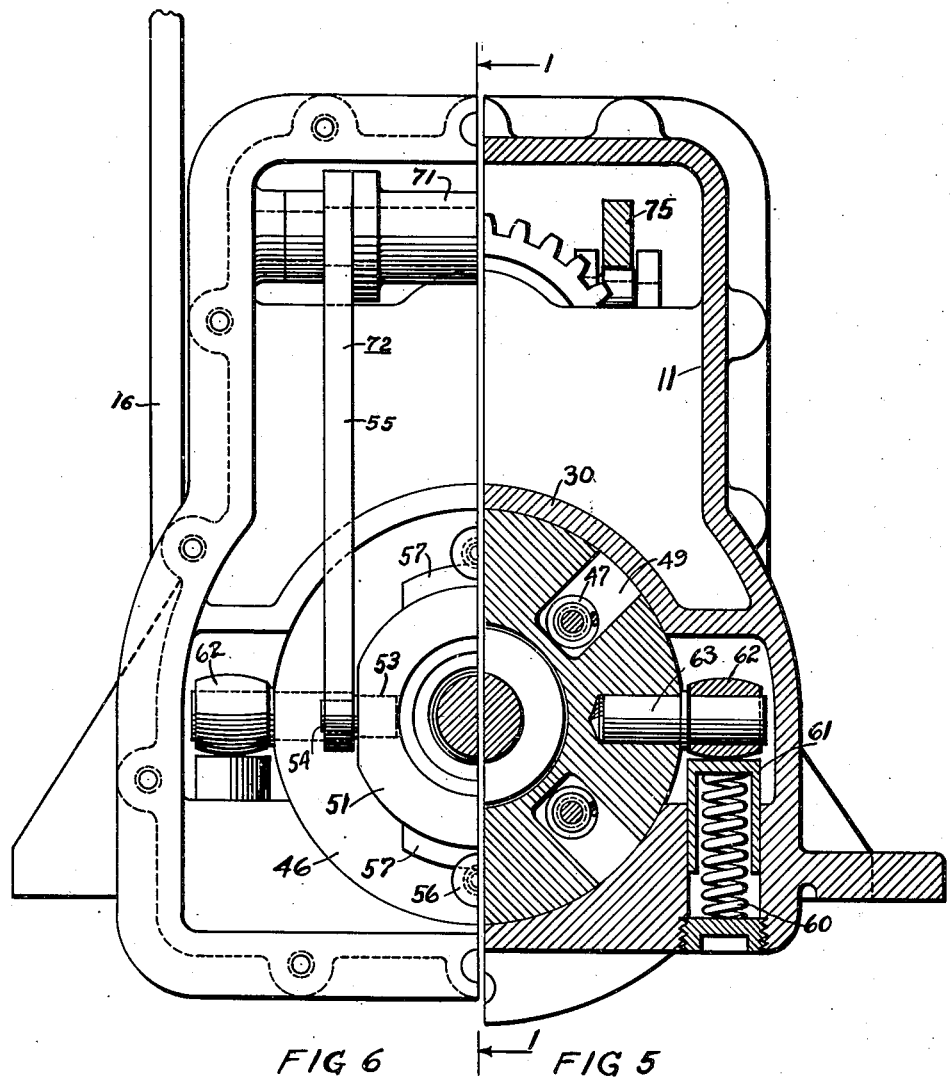

Referring now also to Figs. 1, 5 and 6, the brake mechanism, for retarding driven shaft 15, comprises an annular brake shoe 44 having suitable brake lining 45 attached thereto. The brake lining engages an annular brake surface on the side face of special gear 26. The brake ring 44 is carried by a series of pins 47, which in turn are carried by a carrier drum 46.

The carrier drum 46 is circular and is axially slidable in cylindrical ways formed by flange 30 and the bottom of the casing body 11. The drum 46 has a number of recesses 49 in which the pins 47 slide and in which are disposed coil springs 48 acting between shoulders on the pins and the rear walls of the recesses 49. A collar 51 is carried on arms 55 and supports part of thrust bearing assembly 52 which is disposed against and supported, in part, by the carrier drum 46. The carrier 51 has a recess 53 to accommodate the stud 54 attached to arms 55. Screws 56 are secured to carrier drum 46 and are engageable with flanges 57 secured to collar 51.

To absorb shock to the brake when it is applied, and to apply a rebound impulse to the driven shaft, a series of springs 60 (Fig. 5) are provided. Springs 60 work within sliding plungers 61 which engage rollers 62 mounted on studs 63 secured to carrier drum 46 (Fig. 5).

The brake is shown in Fig. 1, in its applied position. The arms 55 have been moved to the right, the collar 51 engaging bearing assembly 52, in turn engaging drum 46. Drum 46 acts upon the coil springs 48 which causes the pins 47 to push the brake lining 45 against the brake surface on special gear 26. When the driven shaft 15 is rotating in one direction, the spring 60 on one side absorbs the shock. When the driven shaft 15 is rotating in the other direction, the other spring 60 absorbs the shock of applying the brake. To release the brake, arms 55 are moved to the left in Fig. 1, moving collar 51 to the left. The flanges 57 on collar 51 engage the screws 56 to slide carrier drum 46 to the left, the sliding drum releasing the brake lining 45 from the brake surface of special gear 26 by engagement of the carrier 46 against shoulder on pins 47.

The shift lever 16 (Fig. 3) is keyed to shaft 64 journalled in the wall of casing body 11. Shaft 64 has keyed thereto a hub 59 having a pair of lower arms 65 and a pair of upper arms 68. The lower arms 65 carry shoes 66 operating in a groove 67 (Fig. 1) on the compound slide gear 32, 33. The upper arms 68 carry swiveled shoes 69 operating in a groove 70 on the hub of slide gear 43. The upper arms 68 also carry rollers 74 on which ride arms 75 (Fig. 1) having cam surfaces 76. The arms 55 and 75 are integral, forming, in effect, bell cranks 72 on each side secured to shaft 77 by keys 188. Sleeve 71 (Figs. 3 and 4) holds bell cranks 72 in spaced relation. Coil springs 78 connect the ends of arms 75 and adjacent parts of case 11 to yieldably urge arms 75 downwardly at all times.

Thus, the reversing lever 16 operates three things: (1) it slides gear 32, 33 longitudinally on main shaft 24; (2) it slides gear 43 longitudinally on countershaft 37; and (3) it applies and releases brake 44, 45.

The position of the parts in Fig. 1 is shown in neutral with the drive shaft 14 disconnected from the driven shaft and with the brake 44, 45 applied. To go ahead, the lever 16 is moved to the right in Fig. 1, causing rollers 74 to slide off cam surfaces 76, disengaging the brake, after which gear 32 engages gear 34 and ahead drive is accomplished.

To shift from neutral to reverse, the shift lever 16 in Fig. 1 is moved to the left, releasing the brake and then causing gear 33 to engage transfer gear 35 and then to cause slide gear 43 to engage special gear 26. Thus, the reverse drive is accomplished through transfer gear 35 and countershaft 37.

To further assist in shifting, special shifting clearance relations are provided between gears 26, 43 and 33, 35. The gears are so arranged that gear 33 meshes gear 35 just before gear 43 meshes gear 26 for the reversing operation. Thus, for reversing from full speed ahead, gear 33 rotating at high speed corresponding to engine speed engages gear 35 which is stationary. This starts shaft 37, which is stationary, in motion and therewith gear 43.

There is a brief lag between the incipient engagement of gears 33, 35 and the engagement of gears 26, 43. There is sufficient time, however, between the engagement of these gear sets to impart a substantial speed to gear 43. At the same time, the action of the brake 45, 46 slowing down the driven shaft 15 stores up energy in one of the springs 60 (Figs. 1, 5 and 6). After the driven shaft 15 has been brought to rest, the rebound of compressed spring 60 imparts a rotative impulse to shaft 15 in the opposite direction, carrying therewith gear 26. Thus, at the time of incipient engagement of gears 26 and 43, the meshing teeth are traveling in the same direction, facilitating easy meshing thereof.

While certain novel features of the invention have been disclosed and are pointed out in the annexed claims, it will be understood that various omissions, substitutions and changes may be made by those skilled in the art without departing from the spirit of the invention.

What is claimed is:

1. In a combined braking and rebound mechanism, a support, a driven shaft, a brake element having an annular brake surface on said shaft, an annular brake shoe cooperating with said brake surface, an axially movable carrier ring concentric with said driven shaft carrying a plurality of pins, said pins supporting said brake shoe, springs between said pins and said carrier, a thrust bearing for axially moving said carrier toward said brake surface, said carrier having abutments, rebound springs between said abutments and said support, whereby, upon application of said brake, said carrier is rotated compressing one of said rebound springs, said compressed rebound spring imparting a starting torque to said driven shaft in the opposite direction after said driven shaft comes to rest.

2. In a combined braking and rebound mechanism, a support, a driven shaft, a brake element having a brake surface on said shaft, a brake shoe cooperating with said brake surface, an axially movable carrier supporting said brake shoe, means for axially moving said carrier toward said brake surface, elastic devices between said carrier and said support, whereby, upon application of said brake, said carrier is rotated compressing said elastic devices, said elastic devices imparting a starting torque to said driven shaft in the opposite direction after said driven shaft comes to rest.

3. In a reversing mechanism, a driven shaft, a forward drive shaft, a reverse drive shaft, gear shifting mechanism for selectively connecting said drive shafts to said driven shaft, a braking mechanism on said driven shaft, a rebound mechanism on said driven shaft, means operative during the shifting operation to operate said braking and rebound mechanism to stop said driven shaft and to impart thereto rotation in the opposite direction, to assist in the shifting operation.

4. In a reversing mechanism, a driven shaft, a forward drive shaft, a reverse drive shaft, speed changing mechanism for selectively connecting said drive shafts to said driven shaft, a braking mechanism, a rebound mechanism, means operative during the shifting operation to operate said braking and rebound mechanism and thereby to impart to said driven shaft rotation, opposite from that in which it then has, to assist in the shifting operation.

5. In a transmission, a drive shaft having a compound sliding gear thereon, said compound sliding gear comprising forward and reverse spur gears, a driven shaft having an internal gear of the same diameter as said forward gear, a countershaft having a fixed-position gear and a sliding gear, an idler gear meshing said fixed-position gear and adapted to be engaged by said reverse gear, and a second gear secured to said driven shaft adapted to be engaged by said countershaft sliding gear, means for shifting said sliding gears in opposite directions, the relation between said sets of meshing gears being such that said reverse gear engages said idler gear slightly in advance of the engagement between said countershaft gear and said second gear, braking devices on said driven shaft for stopping the rotation of said driven shaft during the shifting operation, and rebound mechanism for using the energy absorbed in braking to impart an initial reverse speed to said driven shaft.

6. In a transmission, a drive shaft, a driven shaft in line with said drive shaft, a driven gear on said driven shaft, an internal gear on said driven shaft, a brake element on said driven shaft, a compound slide gear on said drive shaft in driving relation thereto, said compound gear comprising a forward gear and a reverse gear, an idler gear engageable by said reverse gear, a countershaft having a pinion meshing said idler gear, a slide gear on said countershaft meshable with said driven gear, a brake element adapted to engage said brake element on said driven shaft, means for shifting said slide gears and engaging said brake elements, and rebound mechanism for using the energy absorbed in braking to impart an initial reverse speed to said driven shaft.

7. In a transmission, a casing having a drive shaft, a pinion on said drive shaft, an internal gear meshing said pinion, a driven shaft journalled in said casing, a special gear on said driven shaft having a brake surface, a square shaft connected to said internal gear and journalled within said special gear, an internal gear secured to said special gear, a compound slide gear on said square shaft comprising forward and reverse spur gears, said forward gear engaging said internal gear, an idler gear engageable by said reverse gear, a countershaft having a pinion meshing said idler gear, a slide gear on said countershaft meshable with said special gear, a brake element engageable with said brake surface, a shift lever, a pivot for said lever between the axes of said drive shaft and countershaft, arms connected to said shift lever engaging said sliding gears, a lever connected to said brake element having a cam surface, and a follower on said shift lever engaging said cam surface to operate said brake element.

8. In a reversing mechanism, a supporting structure having a driven shaft, a forward drive shaft, a reverse drive shaft, a reversing element for selectively connecting said drive shafts to said driven shaft, a brake element movable with said driven shaft, a second and relatively stationary brake element adapted to engage said first brake element, spring devices between said second brake element and said supporting structure to absorb rotary torque, a shifting member connected to said reversing element and to said second brake element for transitory engagement of said brake elements during the shifting operation.

9. In a reversing mechanism, a supporting structure having a driven shaft, a forward drive shaft, a reverse drive shaft, a reversing element for selectively connecting said drive shafts to said driven shaft, a brake element having an annular brake surface on said driven shaft, a second and relatively stationary brake element adapted to engage said brake surface, spring devices between said second brake element and said supporting structure to absorb torque, a shifting lever connected to said reversing element and connected to said second brake element for transitory engagement of said brake surface and second brake element during the shifting operation.

10. In a reversing mechanism, a supporting structure having a driven shaft, a drive shaft, means including a shiftable member for imparting a forward speed or a reverse speed to said driven shaft, a brake element movable with said driven shaft, a second and relatively stationary brake element adapted to engage said first brake element, spring devices between said driven shaft and said supporting structure to absorb rotary torque when said brake elements engage, a shifting member connected to said shiftable member and to said second brake element for transitory engagement of said brake elements during the shifting operation.

WILLIAM H. JOHNSON.